United States Patent [19]

Goldberg et al.

[11] Patent Number: 5,517,536
[45] Date of Patent: May 14, 1996

[54] MAGNETIC COUPLING DEVICE FOR CONTROL ROD DRIVE

[75] Inventors: Neal J. Goldberg, San Jose; Charles W. Dillmann, Morgan Hill; Floyd F. Smith, Jr., San Jose, all of Calif.

[73] Assignee: General Electric Company, San Jose, Calif.

[21] Appl. No.: 296,062

[22] Filed: Aug. 24, 1994

[51] Int. Cl.⁶ ................................................. G21C 7/06
[52] U.S. Cl. .................... 376/232; 376/228; 376/233; 376/242; 376/234; 376/237
[58] Field of Search ................................. 376/228, 232, 376/233, 242, 234, 237; 976/DIG. 128, DIG. 129; 180/383, 376

[56] References Cited

U.S. PATENT DOCUMENTS

| | | | |
|---|---|---|---|
| 3,558,948 | 1/1971 | Laing | 310/157 |
| 3,583,254 | 6/1971 | Winders | 74/424.8 |
| 3,599,498 | 8/1971 | Misenti | 74/25 |
| 3,619,675 | 11/1971 | Baker | 310/80 |
| 3,714,479 | 1/1973 | Moore et al. | 310/80 |
| 3,822,439 | 7/1974 | Wallin et al. | 74/424.8 R |
| 3,974,408 | 8/1976 | Fehr et al. | 310/103 |
| 4,044,622 | 8/1977 | Matthews | 74/424.8 R |
| 4,314,882 | 2/1982 | Etienne et al. | 376/235 |
| 4,472,348 | 9/1984 | Desfontaines | 376/228 |
| 4,518,559 | 5/1985 | Fischer et al. | 376/230 |
| 4,618,471 | 10/1986 | Defaucheux et al. | 376/228 |
| 4,699,752 | 10/1987 | Brahm et al. | 376/260 |
| 4,904,443 | 2/1990 | Carruth | 376/233 |
| 5,089,211 | 2/1992 | Dillmann | 376/232 |
| 5,128,093 | 7/1992 | Ose | 376/219 |
| 5,200,140 | 4/1993 | Kobsa et al. | 376/227 |

*Primary Examiner*—Donald P. Walsh
*Assistant Examiner*—Meena Chelliah
*Attorney, Agent, or Firm*—James E. McGinness

[57] ABSTRACT

A control rod drive having a magnetic coupling device which eliminates the need for packing-type seal assemblies for preventing leakage from the reactor pressure vessel adjacent the spindle. The magnetic coupling device includes a driving rotor and a driven rotor separated by a pressure barrier which forms part of the reactor pressure boundary. The driven rotor and the driving rotor are coupled magnetically so that the driven rotor rotates in response to rotation of said driving rotor, whereby the control rod displaces in response to operation of the drive motor. The driven and driving rotors are each constructed by stacking a plurality of circular magnetic rings concentric with a centerline axis. Each circular ring has multiple poles circumferentially distributed thereon. An anti-rotation device is incorporated to prevent free rotation of the spindle when the drive motor is removed during maintenance operations. The anti-rotation device includes a push rod actuator which penetrates the pressure barrier. One end of the push rod actuator bears against the drive motor. The other end of the push rod actuator engages a stop lug to block rotation of the spindle when the drive motor is removed.

16 Claims, 4 Drawing Sheets

MAGNETIC COUPLING DEVICE FOR CONTROL ROD DRIVE

FIELD OF THE INVENTION

This invention relates generally to control rod drives used in nuclear reactors and, more specifically, to a control rod drive which eliminates conventional packing-type seal assemblies for the rotating spindle thereof.

BACKGROUND OF THE INVENTION

In one type of nuclear reactor, control rods are selectively inserted and withdrawn from a nuclear reactor core for controlling the operation thereof. Each of the control rods is typically positioned by a conventional control rod drive which includes a ball screw or spindle threadably engaging a ball nut for raising or lowering the ball nut as the spindle is rotated either clockwise or counterclockwise respectively. A hollow piston rests upon the ball nut at one end thereof and at its other end is conventionally joined to the control rod. Displacement of the ball nut provides displacement of the piston which in turn inserts or withdraws the control rod in the core.

In order to achieve faster insertion of the control rod than can be obtained by normal rotation of the ball spindle, for example, during a scram operation, a rapid flow of high-pressure water is injected through the control rod drive past the piston for lifting the piston off the ball nut in a relatively short time for quickly inserting the control rod into the core. The high-pressure water is channeled to the control rod drive through a scram line pipe attached to a high-pressure water accumulator.

In one type of occurrence which allows for rapid backflow of the water past the piston, due to, for example, a break in the scram line, the backflow may cause a large reverse pressure on the piston which in turn provides a back force on the control rod ball nut. This back force can cause reverse rotation of the ball spindle with corresponding withdrawal of the control rod. Withdrawal of one of the control rods due to such a backflow occurrence may cause damage to adjacent fuel in the reactor vessel. Replacement of the damaged fuel leads to undesirable down time of the reactor and economic losses.

In order to prevent the above occurrence, a conventional electromechanical brake is provided in the control rod drive for holding the ball spindle from rotating unless the brake is energized. The brake is sized for restraining rotation of the ball spindle against such forces due to backflow of water over the piston when the control rod drive motor is not operating. When the control rod drive motor is operating, the motor itself is sized for providing adequate torque for resisting the forces due to the backflow of water in the event of the above-described occurrence.

The scram-line water provided to the control rod drive is conventionally discharged from the housing of the drive into the main reactor pressure vessel. Under normal operating conditions the scram-line water flows continuously as purge flow at a pressure greater than that of the reactor coolant flowing inside the reactor vessel. In a scram operation, the accumulator discharges and thus increases the pressure of the scram-line water. The reactor coolant normally flowing inside the reactor vessel in an exemplary boiling water reactor (BWR) has a pressure of about 73 kg/cm$^2$ (1,040 psi) and a temperature of about 270° C. (518° F.), with the purge flow pressure being correspondingly higher. Accordingly, the control rod drive housing which is joined to the main reactor vessel forms part of the pressure vessel which is subject to high-pressure, high-temperature water. During the scram operation, the pressure of the scramline water channeled into the control rod drive housing has even higher pressure.

In an exemplary control rod drive, the ball spindle is rotated by a conventional motor mounted outside of the pressure vessel. Therefore, the ball spindle extends through the pressure vessel and thus requires a suitable seal, such as a conventional packing-type seal assembly for preventing unacceptable leakage of the high-pressure, high-temperature reactor coolant and purge flow from the control rod housing to outside of the pressure vessel. Such a seal assembly results in a more complex control rod drive, is typically renewed periodically, which adds to downtime of the reactor and costs, and may also be subject to occasional undesirable sticking of the packing seal and the ball spindle, which temporarily resists rotation of the ball spindle.

SUMMARY OF THE INVENTION

The present invention is a control rod drive having a magnetic coupling device which eliminates the need for packing-type seal assemblies for preventing leakage from the reactor pressure vessel adjacent the spindle. The magnetic coupling device is comprised of a driving rotor and a driven rotor separated by a pressure barrier which forms part of the reactor pressure boundary. The driving rotor is securely mounted on the end of a shaft of a drive motor. The driven rotor is connected to the spindle by a drive shaft.

In accordance with the preferred embodiment of the invention, the driven rotor is circular cylindrical and the driving rotor has a generally cup-type configuration. The portion of the driving rotor which interfaces with the driven rotor is also circular cylindrical and is mounted concentric with the driven rotor. In each of the driving and driven rotors, the magnets are stacked in assemblies of circular rings arranged concentric with a centerline axis. Each circular ring has multiple poles circumferentially distributed thereon. This cylindrical rotor arrangement enables efficient use of the space inside the coupling housing.

In accordance with a further aspect of the invention, an anti-rotation device is incorporated to prevent free rotation of the spindle when the drive motor is removed during maintenance operations. The anti-rotation device in accordance with a preferred embodiment comprises a push rod actuator which penetrates the pressure barrier and the bearing housing. The push rod actuator includes an engagement tooth which can be moved into and out of engagement with a stop lug mounted on a spring cup, which is in turn securely mounted on the drive shaft and rotates therewith. A compression spring urges the push rod actuator into a locking position when the drive motor is removed. In the locking position, the engagement tooth obstructs the orbit of the stop lug, thereby preventing free rotation of the spindle, especially in the direction which would lower the control rod out of the fuel core.

DETAILED DESCRIPTION OF THE PREFERRED EMBODIMENTS

Figure 1:
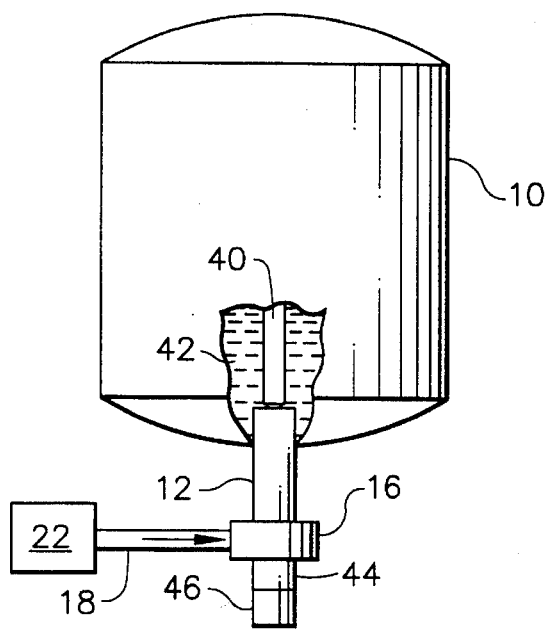
FIG. 1 is a schematic representation of a nuclear reactor pressure vessel including a control rod drive of the type wherein the control rod is raised or lowered in response to rotation of a spindle.
Figure 2:
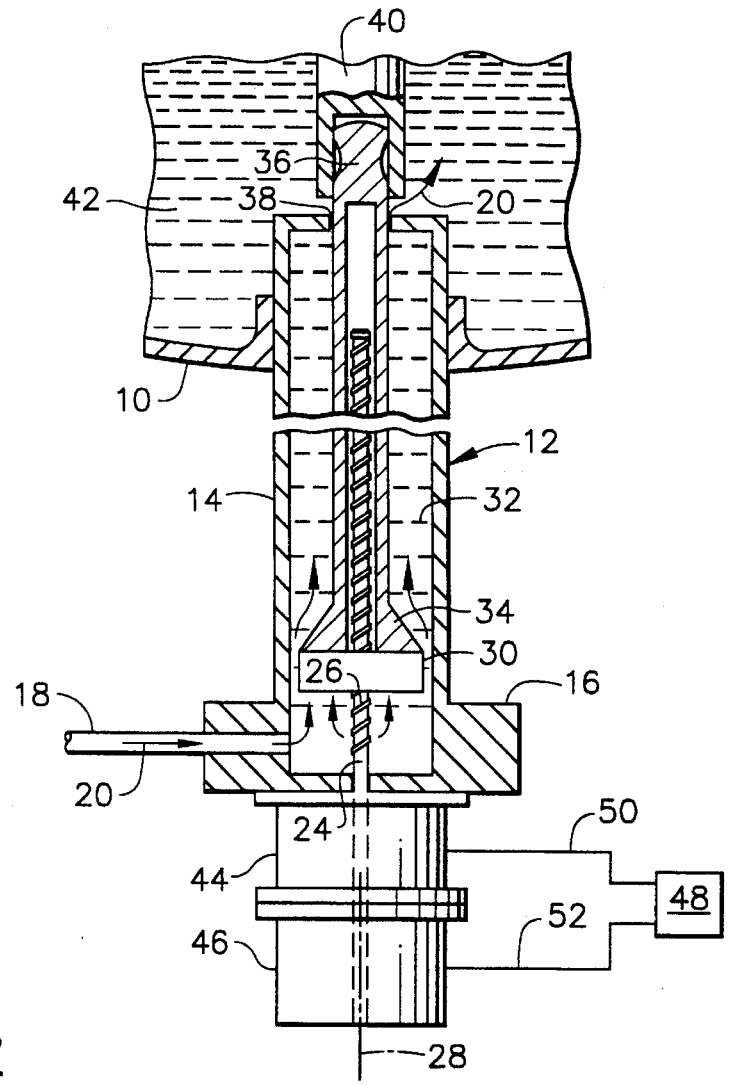
FIG. 2 is a sectional view, partly schematic, of a control rod drive of the type illustrated in FIG. 1.

Illustrated in FIG. 1 is a conventional reactor pressure vessel 10 of a BWR having a plurality of fine motion control rod drives 12, only one of which is shown. In one exemplary embodiment, there are 205 fine motion control rod drives 12 extending into the pressure vessel 10 through the bottom thereof. Referring also to FIG. 2, an enlarged, sectional view of one fine motion control rod drive 12 is illustrated. The control rod drive 12 includes a tubular housing 14 extending downwardly and outwardly from the pressure vessel 10 and secured thereto. The housing 14 is connected to a flange or manifold 16 which is in flow communication with a scram line or conduit 18. The scram line is provided with high-pressure scram-line water 20 from a high-pressure water accumulator 22 (see FIG. 1).

A ball screw or spindle 24 is disposed inside housing 14. The spindle 24 has threads 26. The control rod drive 12 includes a longitudinal centerline axis 28, with the housing 14 and spindle 24 being disposed coaxially therewith.

A ball nut 30 is threadably coupled to spindle 24 and is restrained from rotating therewith. As a result, when the spindle is rotated in one direction, the ball nut translates downward and away from the pressure vessel 10, and when the spindle is rotated in the other direction, the ball nut 30 translates upward and toward the core. A hollow, elongate piston 32 is disposed coaxial with the spindle 24 and includes a conical base end 34, which rests on the ball nut 30, and a tip end 36 extending through a central aperture 38 in the upper end of housing 14 into the pressure vessel 10. The tip end 36 is coupled to a respective control rod 40 by a bayonet coupling. Therefore, rotation of spindle 24 vertically displaces the control rod.

As shown in FIGS. 1 and 2, the pressure vessel 10 includes a pressurized reactor coolant 42 which is circulated through the pressure vessel 10 for providing cooling therein. The reactor coolant 42 typically has an operating pressure of about 73 kg/cm$^2$ (1,040 psi) and a temperature of about 270° C. (518° F.). The control rod drive housing 14 is fixedly joined to the vessel 10 and forms part of the pressure vessel 10 since the reactor coolant 42 is in flow communication with aperture 38 of housing 14 and with housing 14 surrounding spindle 24.

Under normal operating conditions, the scram-line water 20 flows continuously through the housing 14 and into the pressure vessel 10 as a pressurized fluid, or purge flow, at a pressure greater than that of the reactor coolant 42. In a scram operation, the accumulator 22 discharges and thus further increases the pressure of the scram-line water 20.

As illustrated in FIG. 2, the spindle 24 is surrounded by the pressurized fluid 20. The spindle 24 is rotated by an electrical motor 44 fixedly joined to the manifold 16. The control rod drive 12 further includes a brake 46 fixedly joined to the motor 44. The spindle 24 extends into the motor 44 and the brake 46.

The motor 44 is connected to a conventional control unit 48 by a first electrical line 50 for selectively energizing and de-energizing the motor 44. The brake 46 is connected to control unit 48 by a second electrical line 52 and is selectively energized and deenergized for allowing unrestricted rotation of spindle 24 or preventing rotation of the spindle 24, respectively.

A control rod drive of the type having a magnetic coupling device for rotating a threaded spindle was disclosed in U.S. Pat. No. 5,089,211 issued to Charles W. Dillmann on Feb. 18, 1992 and assigned to General Electric Company. The structure and operation of this magnetic coupling device will be described with reference to FIGS. 3 and 4.

In accordance with the teaching of U.S. Pat. No. 5,089,211, the motor 44 includes an annular motor housing 54 which is fixed joined to the manifold 16 for forming part of the pressure vessel 10. The housing 54 includes a plurality of circumferentially spaced spokes 56 which support a bearing 58, which in turn supports a portion of spindle 24. No seals are provided between spokes 56, bearing 58 and manifold 16 so that the pressurized fluid 20 is allowed to flow freely inside the upper portion of the housing 54.

The motor includes a driven rotor which is joined to the spindle 24 for rotation therewith within the housing 54. The motor also includes means for selectively rotating the rotor either clockwise or counterclockwise. In accordance with a magnetic coupling embodiment disclosed in U.S. Pat. No. 5,089,211, a flat disc 92 comprises the driven rotor fixedly joined to the spindle 24. The disc 92 is disposed substantially perpendicular to the centerline axis 28 and includes a plurality of circumferentially spaced and radially extending permanent magnets 94 (see FIG. 4) secured in complementary recesses 96 in one of the faces of disc 92. An annular flat plate membrane 98 is joined to the housing 54 and faces the permanent magnets 94. The membrane 98 forms a part of the pressure vessel 10 for containing the pressurized fluid 20 inside the portion of the housing 54 which surrounds disc 92 and spindle 24. The membrane 98 prevents the pressurized fluid 20 from flowing inside the motor 100 as well as the brake housing 72. As a result, the spindle 24 is not required to breach the pressure vessel. Thus, a suitable seal for preventing leaking around the spindle is not required.

A conventional electrical motor 100 is disposed inside the housing 54 on the non-pressure side of the membrane 98 and includes an output shaft 102. Another flat disc 104 is joined to the output shaft 102. Disc 104 includes a plurality of circumferentially spaced and radially extending permanent magnets 106 secured in complementary recesses 108 formed in one of the faces of disc 104. The magnets 106 face the membrane 98 adjacent to magnets 94 on opposite sides of the membrane 98 for generating a magnetic coupling force therebetween. An electrical wire 50 is connected to the electrical motor 100 through the non-pressurized portion of the housing 54 for selectively powering the motor 100 to rotate the disc 104. Rotation of disc 104 in turn induces rotation in disc 92 by magnetic coupling therewith. Since the spindle is connected to disc 92, the spindle is rotated in dependence on the control signals received via electrical line 50.

Figure 3:
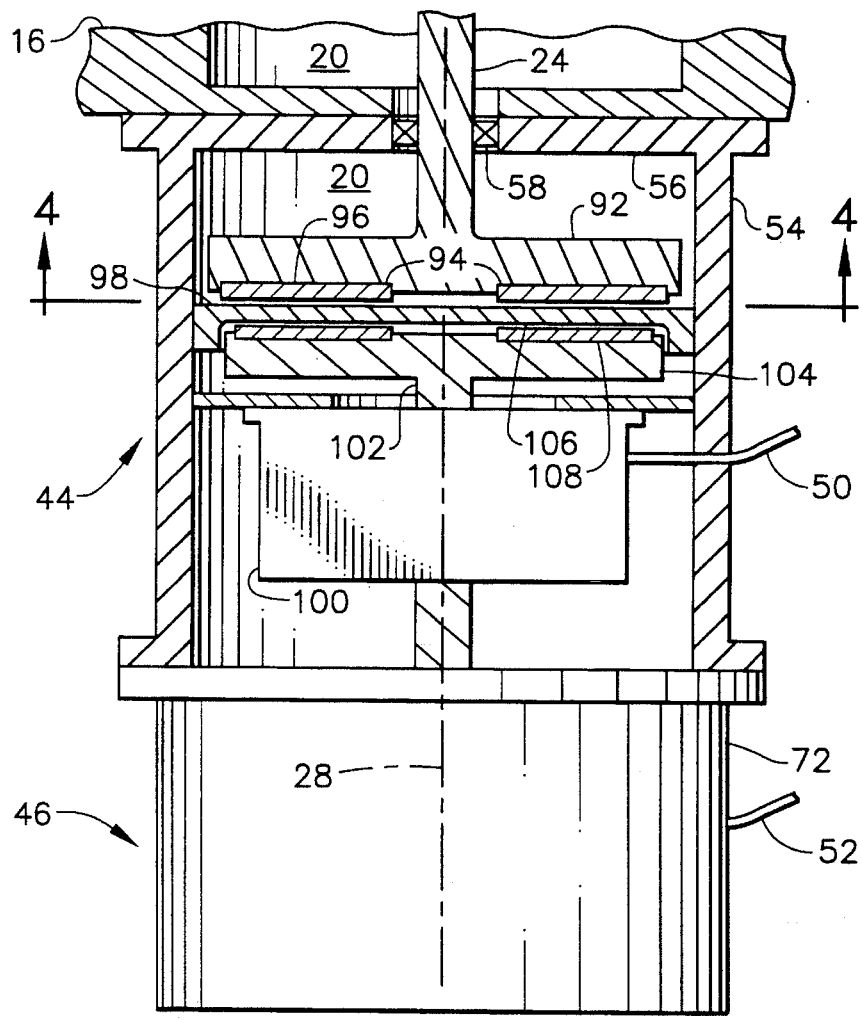
FIG. 3 is a longitudinal sectional schematic view of a concept for a control rod drive including a motor and brake.
Figure 4:
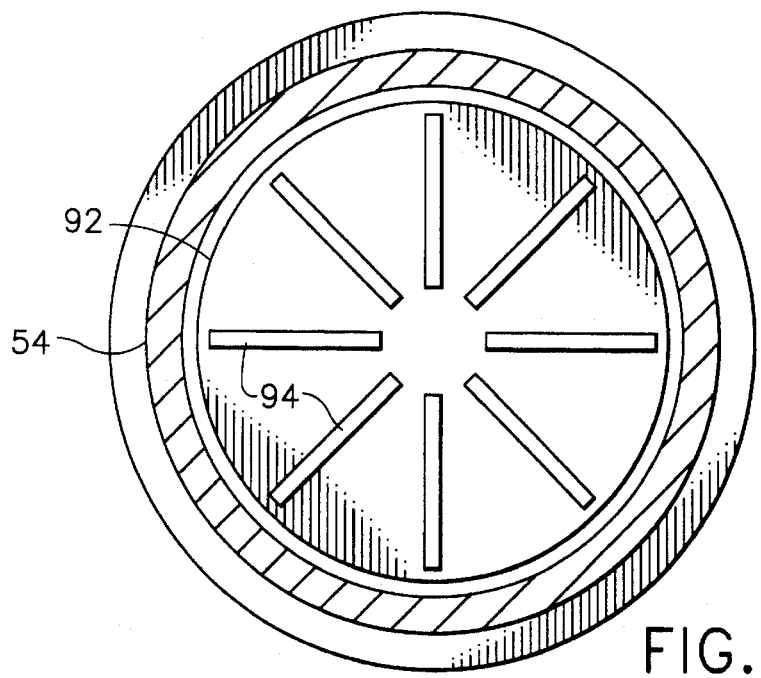
FIG. 4 is a transverse sectional view of the control rod drive motor of FIG. 3 taken along line 4—4.
Figure 5:
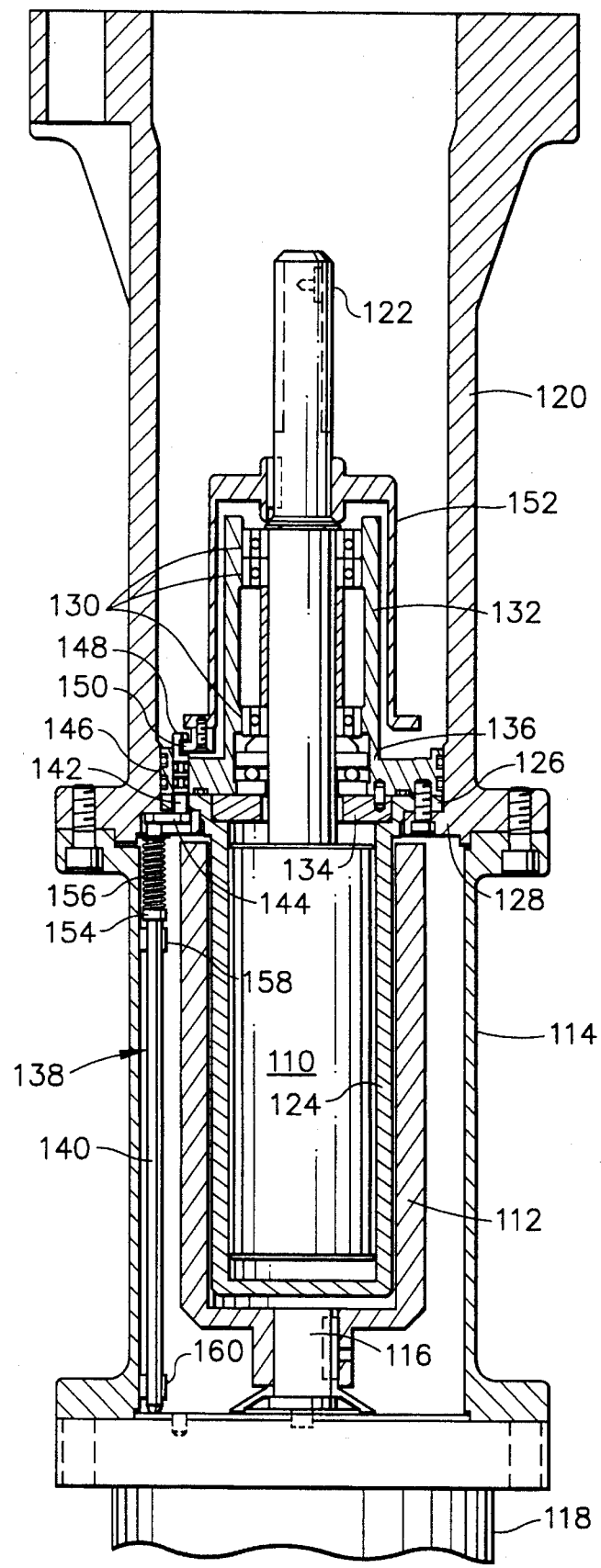
FIG. 5 is a longitudinal sectional schematic view of a control rod drive in accordance with the preferred embodiment of the present invention, with the antirotation device in the unlocking position.

The present invention improves upon the magnetic coupling device shown in FIGS. 3 and 4. Referring to FIG. 5, the magnetic coupling device of the invention comprises a driven rotor 110 which is circular cylindrical and a driving rotor 112 which has a generally cup-type configuration. The portion of driving rotor 112 which interfaces with the driven rotor 110 is also circular cylindrical and is mounted to be concentric with the driven rotor. In each rotor, the magnets are stacked in assemblies of circular rings arranged concentric with a centerline axis. Each circular ring has multiple poles circumferentially distributed thereon. This cylindrical rotor arrangement enables efficient use of the space inside the coupling housing 114.

The driving rotor 112 is securely mounted on the end of a shaft 116 of a drive motor housed inside drive motor housing 118. The upper flange of drive motor housing 118 is bolted to a lower flange of coupling housing 114. The upper flange of coupling housing 114 is in turn bolted to a lower flange of a spool piece housing 120.

The driven rotor 110 is securely mounted on the bottom end of a drive shaft 122. The driven rotor and drive shaft are coaxial. The top end of drive shaft 122 is in turn securely connected to the bottom end of the threaded spindle (not shown in FIG. 5). The drive shaft 122 is rotatably supported by a plurality of radial ball bearings 130 housed in a bearing housing 132. The drive shaft 122 is vertically supported by a thrust plate 134 via a thrust bearing 136. The thrust plate 134 is seated on an annular ledge of the pressure barrier 124.

The outside diameter of the driven rotor 110 is less than the inside diameter of the cylindrical portion of the driving rotor 112 by an amount 2w, so that an annular gap of width w is formed between the rotors. A pressure barrier 124 which has a generally cup-type configuration, i.e., a circular cylindrical wall which is closed at the bottom, is installed in this annular gap. The pressure barrier 124 forms a part of the pressure vessel for containing the pressurized fluid inside the portion of the coupling housing 114 which surrounds the driven rotor 110. As a result, the drive shaft 122 is not required to breach the pressure vessel.

To minimize the resistance to the lines of magnetic flux by which the driven rotor is coupled to the driving rotor, the pressure barrier is made of non-magnetic austenitic alloy. This austenitic alloy should also have very high strength so that adequate structural strength can be provided using the thinnest possible configuration.

The pressure barrier 124 further comprises an upper flange 126, by means of which the pressure barrier can be mounted on the spool piece housing 120. Flange 126 is backseated against and bolted to an annular lip 128 which extends radially inward at the bottom of spool piece housing 120. This mounting effectively doubles the total structural thickness of the barrier flange so that the pressure barrier is able to withstand the design pressure. The bearing housing 132 is structurally reinforced by seating its flange within the spool piece housing 120 and on top of the upper flange 126 of the pressure barrier 124.

In accordance with the present invention, the spindle connected to drive shaft 122 can be rotated in either direction in dependence on the direction of rotation of shaft 116. In response to rotation of shaft 116, the driving rotor 112 is rotated. The rotating magnet rings of driving rotor 112 induce rotation of the magnet rings of driven rotor 110 across the pressure barrier 124. The rotation of driven rotor 110 in turn causes the drive shaft 122 to rotate, along with the spindle which is securely coupled thereto. In this way, a control rod can be raised or lowered using an apparatus which does not require penetration of the reactor pressure boundary by any rotating element. Consequently, the problems associated with sealing such a penetrating rotating element are avoided.

The control rod drive in accordance with the present invention further comprises an anti-rotation device to prevent the control rod spindle from free-wheeling when the driving rotor is removed, as would be necessary for motor maintenance. The anti-rotation device in accordance with the preferred embodiment comprises a push-rod actuator 138 which blocks rotation of the spindle in response to removal of the drive motor housing 118.

The push-rod actuator 138 comprises a push rod 140 and a lock pin 142 which are rigidly connected by a horizontal link 144. The lock pin 142 penetrates the lip 128 of the spool piece housing 120, the flange 126 of the pressure barrier 124 and the flange of the bearing housing 132. Penetration through the bearing housing flange is accomplished by O-ring seals 146.

The lock pin 142 has an engagement tooth 148 which can be moved into and out of engagement with a stop lug 150 which is effectively coupled to the spindle via a spring cup 152 securely mounted on the drive shaft. The circular cylindrical wall of the spring cup is coaxial with the axis of rotation of drive shaft 122. Spring cup 152 has a radially outwardly directed flange on which a spring (not shown) of a table weighing mechanism (not shown) is seated. The stop lug 150 is secured to the bottom surface of the spring cup flange.

The push rod 140 is a circular cylindrical bar of high-strength alloy which is guided for sliding in the vertical direction by a pair of push rod guides 158 and 160 separated by a predetermined height. These guides allow vertical sliding of the push rod between first and second positions. Each of guides 158 and 160 may comprise a single ring-like structure welded to the coupling housing 114 or, in the alternative, each guide may comprise a pair of curved members welded to the coupling housing. In either case, the guides are shaped to prevent lateral displacement of the push rod.

A collar 154 is secured to the push rod at a position along its length such that the collar will be disposed above guide 158 when the push rod is installed. A compression spring 156 is seated atop collar 154 and surrounds a portion of the push rod extending above collar 154. The push rod is in its first position when the drive motor is mounted on coupling housing 114, as shown in FIG. 5. When the drive motor is in place, the bottom tip of the push rod 140 bears against the front face of the drive motor housing 118 and the compression spring 156 is compressed between collar 154 and the bottom surface of lip 128 of spool piece housing 120. This compression of spring 156 urges the push rod downward. However, downward displacement of push rod 140 is blocked by the front face of the drive motor housing 118 as long as the drive motor is secured to the coupling housing 114. When the push rod is in its first position, the engagement tooth 148 does not intersect the orbit of stop lug 150 and thus does not prevent spindle rotation.

Figure 6:
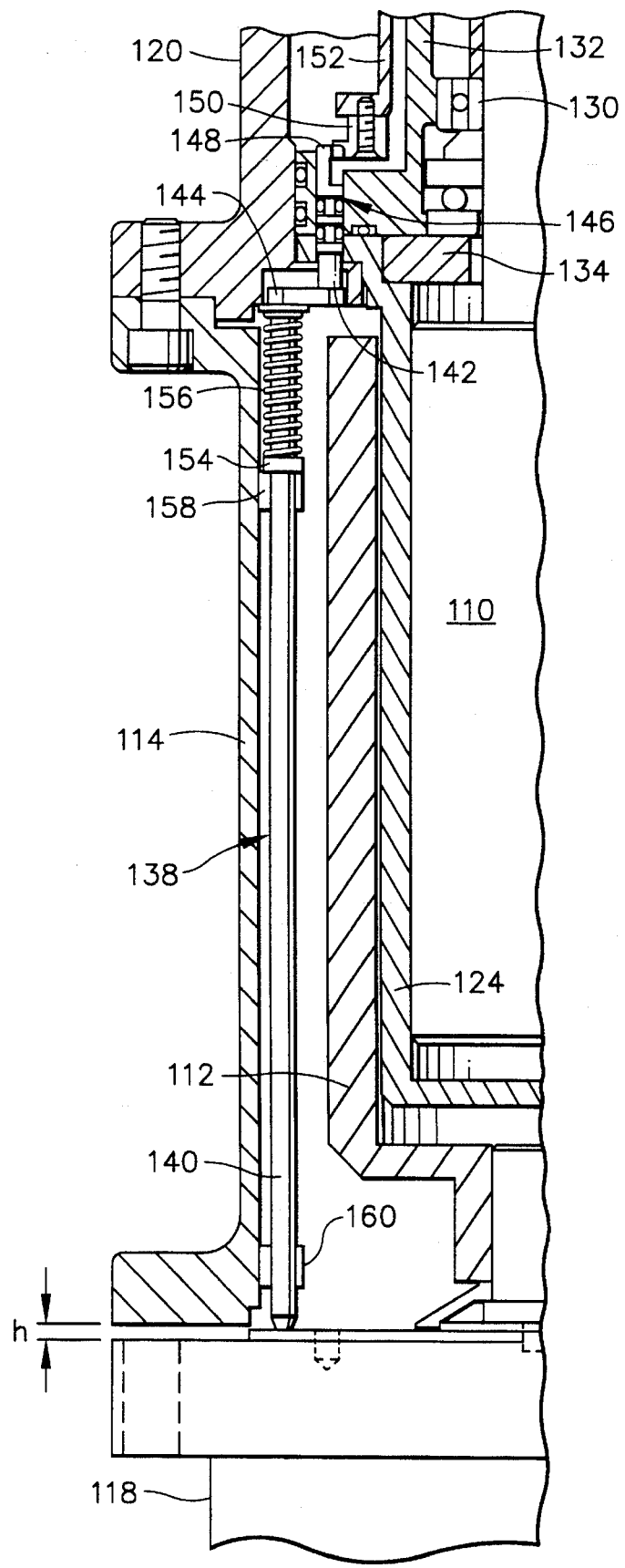
FIG. 6 is a partial longitudinal sectional schematic view of a control rod drive in accordance with the preferred embodiment of the present invention, with the anti-rotation device in the locking position.

The anti-rotation device is designed so that the engagement tooth 148 is lowered into the path of the rotating stop lug 150 when the drive motor is removed. More specifically, the anti-rotation device is designed so that a vertical distance h of motor travel fully engages the tooth, as shown in FIG. 6. When the drive motor housing 118 is lowered by a height h, the compression spring 156 urges the push rod 140 and lock pin 142 downward by the same distance. If the drive motor is removed, then the push rod will displace downwardly until the collar 154 abuts guide 158. This is the second position of the push rod referred to above. When the push rod is in its second position, the engagement tooth 148 fully engages stop lug 150 and thus prevents spindle rotation. In particular, spindle rotation in the direction that would lower the control rod out of the fuel core is prevented during motor maintenance.

The preferred embodiment of the magnetic coupling device in accordance with the invention have been disclosed for the purpose of illustration. Variations and modifications of the disclosed structure which do not depart from the concept of this invention will be readily apparent to persons skilled in the art of control rod drive design. All such variations and modifications are intended to be encompassed by the claims set forth hereinafter.

We claim:

1. A control rod drive comprising:
   a drive motor having an output shaft;
   a driving rotor connected to and coaxial with said output shaft of said drive motor, said driving rotor being made of permanent magnetic material;
   a driven rotor arranged inside and concentric with said driven rotor, said driven rotor being made of permanent magnetic material;
   a drive shaft connected to said driven rotor and coaxial with said output shaft of said drive motor;
   a cup-shaped pressure barrier having a circular cylindrical wall arranged between said driven rotor and said driving rotor, said pressure barrier being made of nonmagnetic material;
   means for coupling to a control rod;
   threaded spindle means for transforming rotation of said drive shaft into translation of said means for coupling to a control rod; and
   bearing means for rotatably supporting said drive shaft,
   wherein said driven rotor and said driving rotor are coupled magnetically so that said driven rotor rotates in response to rotation of said driving rotor, whereby said means for coupling to a control rod displaces in response to operation of said drive motor.

2. The control rod drive as defined in claim 1, wherein each of said driven and driving rotors comprises a plurality of rings of magnetic material arranged in a stack, said stack of magnetic rings of said driven rotor being surrounded by said stack of magnetic rings of said driving rotor.

3. The control rod drive as defined in claim 2, wherein each of said magnetic rings has a plurality of poles circumferentially distributed therein.

4. The control rod drive as defined in claim 1, further comprising means for housing said threaded spindle means, said housing means having a radially inwardly directed annular lip at a bottom end thereof, wherein said pressure barrier comprises a radially outwardly directed flange which is backseated against said lip.

5. The control rod drive as defined in claim 4, wherein said bearing means comprises a bearing housing seated on said flange of said pressure barrier.

6. The control rod drive as defined in claim 1, further comprising means for housing said driving and driven rotors, and means for blocking rotation of said threaded spindle means in a first state and not blocking rotation of said threaded spindle means in a second state, wherein said drive motor is mounted on said housing means in said second state and said drive motor is disengaged from said housing means in said first state.

7. The control rod drive as defined in claim 6, wherein said rotation blocking means comprises a push rod actuator which penetrates said pressure barrier, one end of said push rod actuator bearing against said drive motor in said second state but not in said first state and another end of said push rod actuator engaging said threaded spindle means in said first state but not in said second state.

8. The control rod drive as defined in claim 7, further comprising means for guiding said push rod actuator to slide between first and second positions, said push rod actuator being in said first position in said first state and being in said second position in said second state, and compression spring means for urging said push rod actuator to slide from said second position toward said first position.

9. The control rod drive as defined in claim 8, wherein said push rod actuator comprises an engagement tooth and said threaded spindle means comprises a stop lug, said engagement tooth being positioned to engage said stop lug when said push rod actuator is in said first position.

10. A magnetic coupling device for coupling a drive motor on one side of a pressure boundary to a driven rotating element on the other side of said pressure boundary, comprising:
    a driving rotor comprising a circular cylindrical arrangement of permanent magnetic material;
    a driven rotor comprising a circular cylindrical arrangement of permanent magnetic material,
    wherein said driven rotor is arranged concentrically inside said driving rotor; and
    a cup-shaped pressure barrier having a circular cylindrical wall arranged between said driven rotor and said driving rotor, said pressure barrier being made of nonmagnetic material.

11. The magnetic coupling device as defined in claim 10, wherein each of said driven and driving rotors comprises a plurality of rings of magnetic material arranged in a stack, said stack of magnetic rings of said driven rotor being surrounded by said stack of magnetic rings of said driving rotor.

12. The magnetic coupling device as defined in claim 11, wherein each of said magnetic rings has a plurality of poles circumferentially distributed therein.

13. In a drive system comprising:
    a pressure boundary;
    a driven rotor and a rotatable element connected to said driven rotor, said driven rotor and said rotatable element being located on one side of said pressure boundary; and
    a drive motor, a driving rotor connected to said drive motor and means for housing said driving rotor, said drive motor, said driving rotor and said housing means being located on the other side of said pressure boundary,
    wherein said driven rotor and said driving rotor are coupled magnetically so that said driven rotor rotates in response to rotation of said driving rotor, whereby said rotatable element rotates in response to operation of said drive motor,
    the improvement wherein said drive system further comprises means for blocking rotation of said rotatable element in a first state and not blocking rotation of said rotatable element in a second state, wherein said drive motor is mounted on said housing means in said second state and said drive motor is disengaged from said housing means in said first state.

14. The drive system as defined in claim 13, wherein said rotation blocking means comprises a push rod actuator which penetrates said pressure boundary, one end of said push rod actuator bearing against said drive motor in said second state but not in said first state and another end of said push rod actuator engaging said rotatable element in said first state but not in said second state.

15. The drive system as defined in claim 13, further comprising means for guiding said push rod actuator to slide between first and second positions, said push rod actuator being in said first position in said first state and being in said second position in said second state, and compression spring means for urging said push rod actuator to slide from said second position toward said first position.

16. The drive system as defined in claim 15, wherein said push rod actuator comprises an engagement tooth and said rotatable element comprises a stop lug tooth being positioned to engage said stop lug when said push rod actuator is in said first position.

* * * * *